United States Patent [19]

Belcher et al.

[11] Patent Number: 4,792,344

[45] Date of Patent: Dec. 20, 1988

[54] AIR FILTERING METHOD AND APPARATUS

[75] Inventors: Mark D. Belcher, Minneapolis; James L. Berkhoel, Woodbury; Bruce A. Hampel, Crystal, all of Minn.

[73] Assignee: Donaldson Company, Inc., Minneapolis, Minn.

[21] Appl. No.: 147,027

[22] Filed: Jan. 19, 1988

Related U.S. Application Data

[63] Continuation of Ser. No. 900,544, Aug. 26, 1986, abandoned.

[51] Int. Cl.⁴ .............................................. B01D 46/04
[52] U.S. Cl. .......................................... 55/96; 55/299; 55/304
[58] Field of Search .................. 55/96, 299, 300, 304, 55/497, 521

[56] References Cited

U.S. PATENT DOCUMENTS

| | | | |
|---|---|---|---|
| 1,395,833 | 3/1920 | Kling et al. | 55/300 |
| 1,775,304 | 9/1930 | Boesger | 55/300 |
| 3,898,414 | 8/1975 | Hawley | 219/72 |
| 3,938,971 | 2/1976 | McClure | 55/300 |
| 3,955,947 | 5/1976 | Hoon et al. | 55/300 |
| 4,199,334 | 4/1980 | Berkhoel | 55/304 |
| 4,204,846 | 5/1980 | Brenholt | 55/272 |
| 4,217,116 | 8/1980 | Seever | 55/96 |
| 4,298,362 | 11/1981 | Krull et al. | 55/304 |
| 4,331,459 | 5/1982 | Copley | 55/302 |
| 4,345,353 | 8/1982 | Sommerfeld | 15/349 |
| 4,443,235 | 4/1984 | Brenholt et al. | 55/218 |
| 4,519,817 | 5/1985 | Gibbons | 55/300 X |
| 4,533,371 | 8/1985 | Nakamura | 55/299 |

Primary Examiner—Charles Hart
Attorney, Agent, or Firm—Merchant, Gould, Smith, Edell, Welter & Schmidt

[57] ABSTRACT

Method and apparatus for filtering air are disclosed. A preferred cabinet collector (10) according to the invention includes a housing defining an upper chamber (b 20a) and a lower chamber (20b). Separating the chambers (20a, 20b) are a pair of wedge-shaped filter assemblies (38, 38'). First ends (42, 42') of the filter assemblies (38, 38') are attached the housing wherein second ends (44, 44') are free. Provision is made to automatically periodically move the second ends (44, 44') to clean the filter media, filter displacement apparatus "snapping" the filter assemblies (38, 38') and another displacement apparatus "vibrating" the filter assemblies (38, 38') to achieve the desired media cleaning.

26 Claims, 4 Drawing Sheets

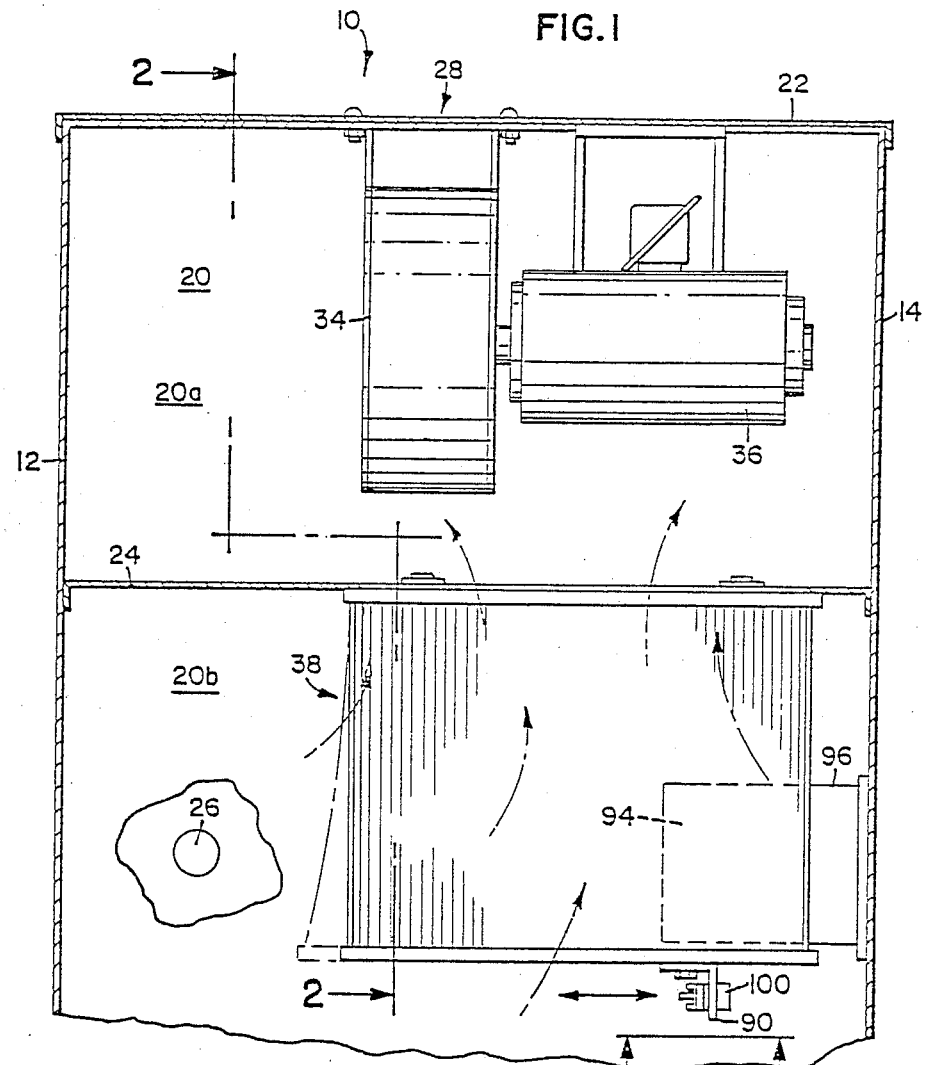
FIG. 1
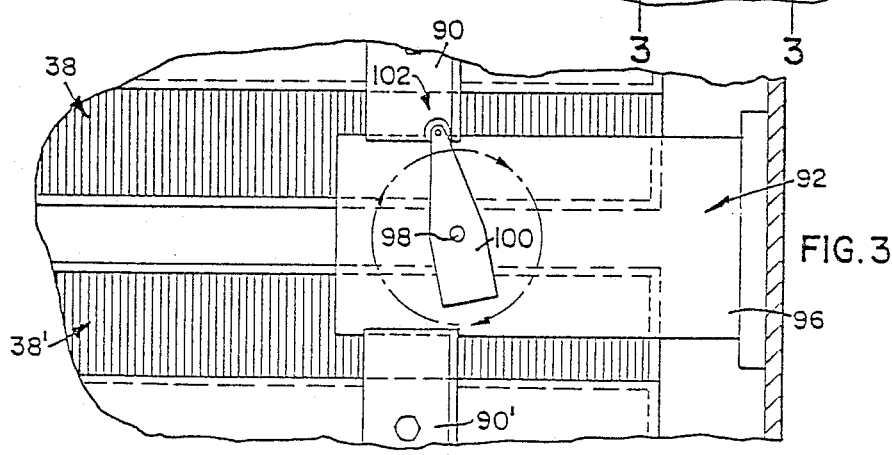
FIG. 3

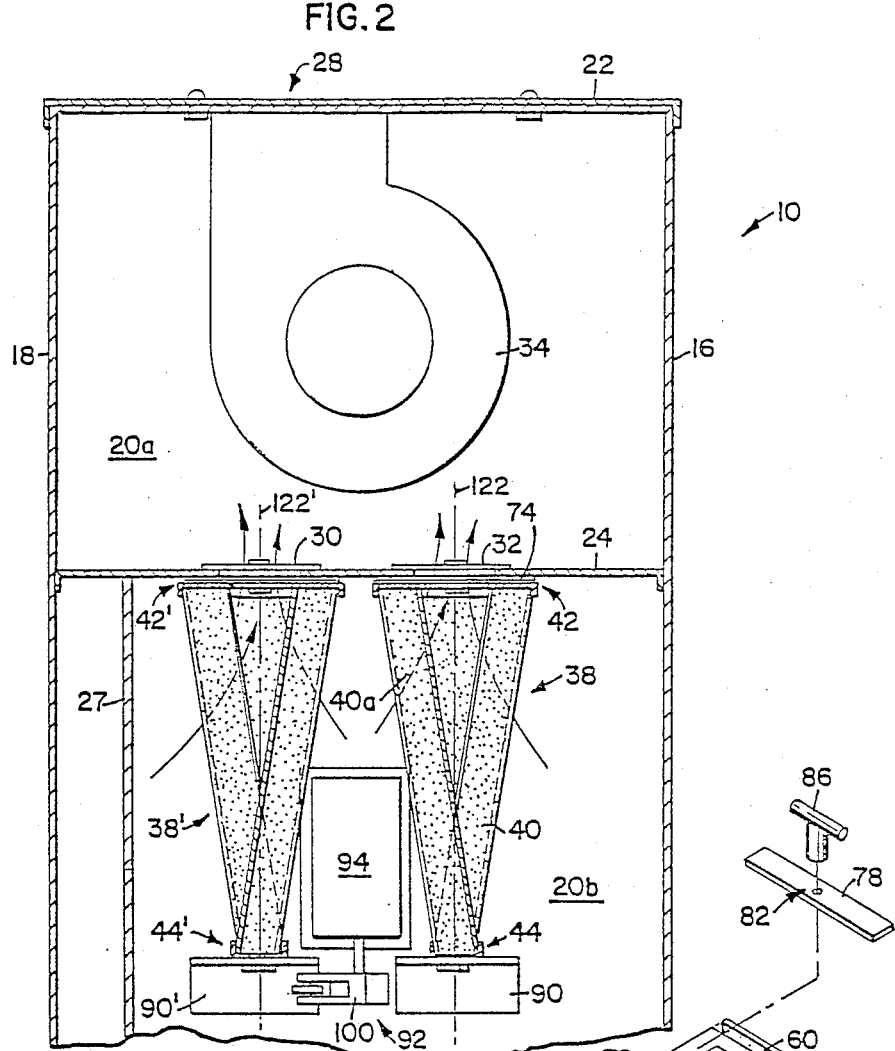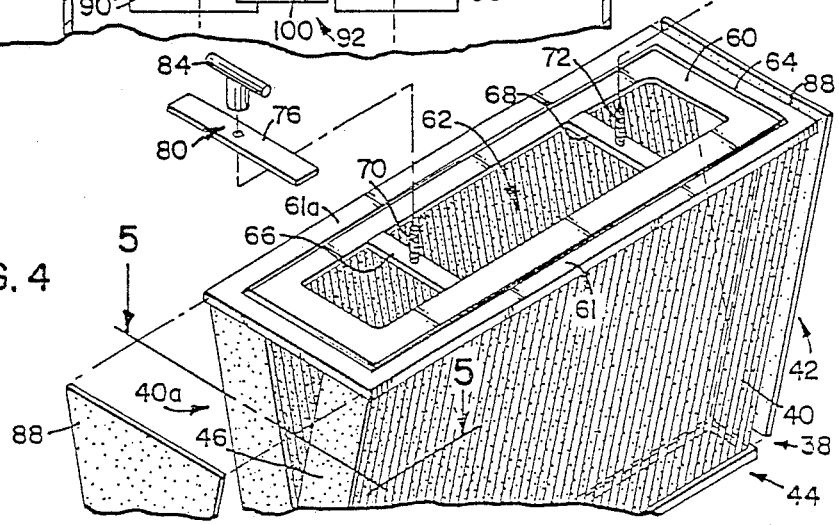

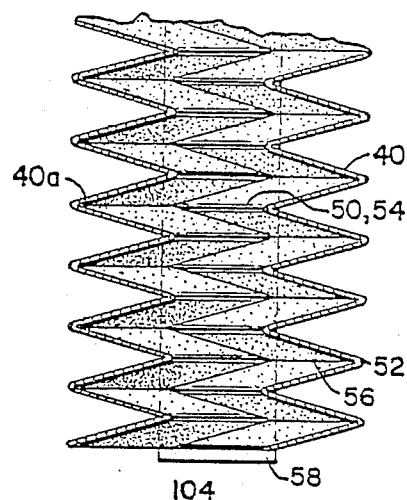
FIG. 5
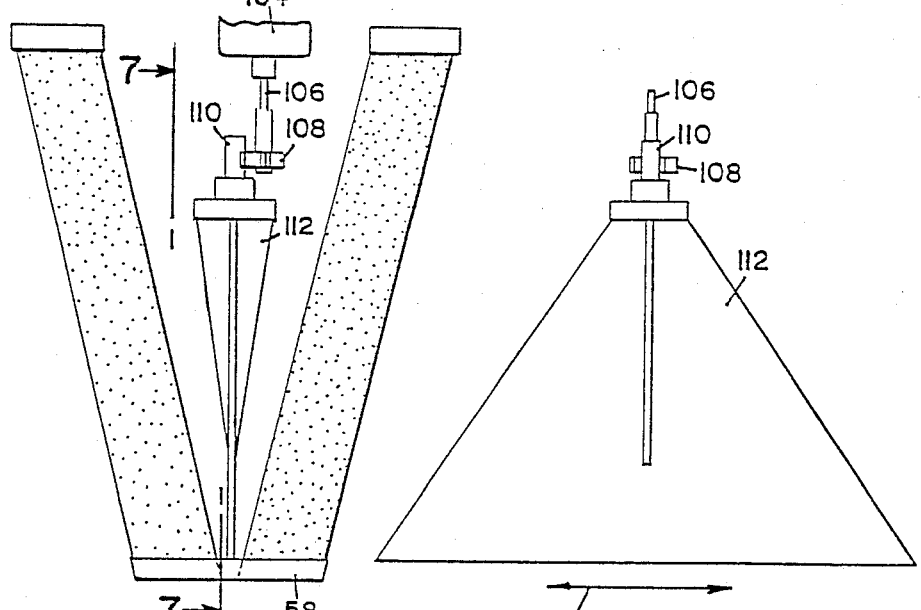
FIG. 6
FIG. 7

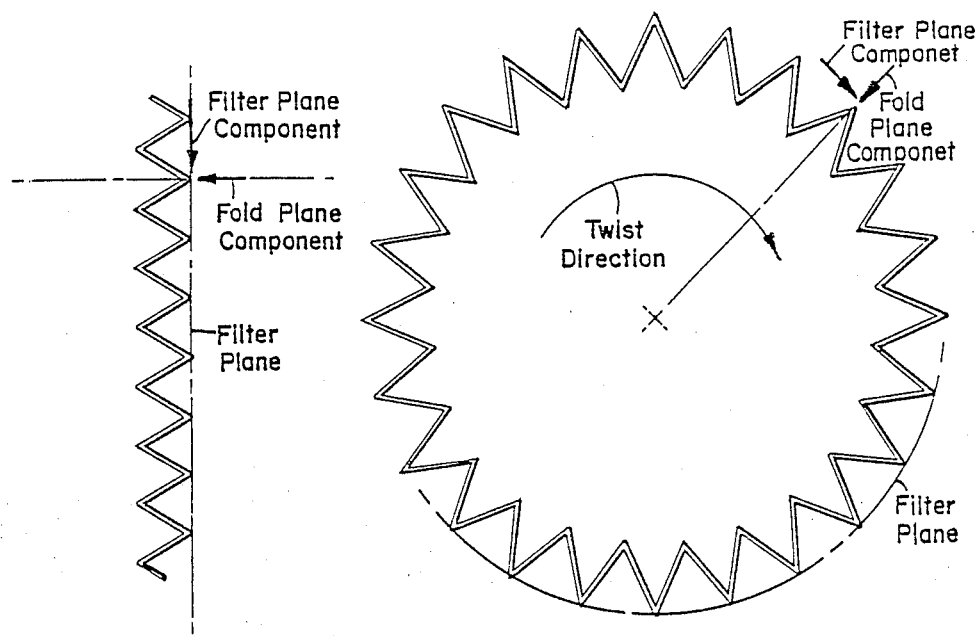
FIG. 8A
PRIOR ART
FIG. 8B

AIR FILTERING METHOD AND APPARATUS

This is a continuation, of application Ser. No. 900,544, filed Aug. 26, 1986 and now abandoned.

FIELD OF THE INVENTION

This invention pertains to air filtering methods and apparatus and, more particularly, to an air filtering technique employing a resilient filter media which is distorted or displaced in such a way that the media is "self-cleaned".

BACKGROUND OF THE INVENTION

In the prior art, air filtering apparatus of the type including an air filter housed in a dedicated cabinet are known for removing contaminants from air exhausted from a machine in an industrial setting. Referred to as cabinet collectors, such air filtering apparatus draw dirty air from a machine such as a saw, grinder, or other source of dirty air. A given cabinet collector is usually dedicated to a particular machine in a factory and substantially prevents the introduction of the generated contaminant into ambient air. Air flow through the machine and the cabinet collector is created by a motor/blower assembly which is housed within the dedicated cabinet.

As a cabinet collector is used to filter dirty air, contaminants become lodged on a surface of the filter media thereby increasing its flow resistance and reducing its overall effectiveness. In view of the fact that replacing the filter media on a regular basis would be prohibitively expensive, the filter media must be cleaned from time to time. While it is possible to enter the interior of the cabinet to manually clean the filter, it is recognized that it would be desirable to have effective automatic means for cleaning the filter element. One attempt to address the need for a self-cleaning cabinet collector is described in commonly assigned U.S. Pat. No. 4,443,235 to Brenholt et al dated Apr. 17, 1984. The Brenholt et al patent describes a frusto-conical filter element constructed from pleated paper filter media. By pleating a porous media a large amount of filtering surface can be placed in a small area. Thus, a filter made of a pleated porous media has a larger filtering surface than a conventional bay or pouch filter. To clean the pleated filter, the smaller axial end of the frusto-conical filter element is twisted about an axis co-axial with the conical axis of the filter element. After the smaller axial end has been twisted a predetermined amount, the end is suddenly released and the filter media suddenly returns to its original shape. The sudden return of the filter element to its original shape causes contaminants disposed on the filter media to become dislodged. An unfortunate consequence of the twisting of the filter element is that the resultant force on a given fold line of the pleated filter media includes a not insignificant "fold plane" component perpendicular to the fold line and perpendicular to the direction of spacing between adjacent pleats, as illustrated in FIG. 8B. This "fold plane" force component tends to collapse the pleat at the fold line. In fact, after a relatively small number of twists and releases, the pleats of the pleated filter media can collapse and seriously impair the cleaning effectiveness of the filter and its ability to "flex clean" itself upon the release of the twisting mechanism.

SUMMARY OF THE INVENTION

Broadly stated, the present invention includes an air filtering apparatus suitable for employing a filter panel defining a filter plane and a fold plane and having a plurality of pleats formed from alternating peaks and valleys, including:

(a) a housing having an air inlet and an air outlet;

(b) means for supporting the filter panel within the housing such that air can flow through the filter panel when passing from the air inlet to the air outlet; and (c) means for applying a force to the filter panel having a filter plane component and a relatively insubstantial fold plane component, whereby the filter plane component assists in the cleaning of the filter panel, and whereby the fold plane component is insufficient to collapse the pleats.

FIG. 8A illustrates filter plane and fold plane components for a panel filter.

According to a preferred embodiment of the present invention, there is provided an air filtering apparatus having a housing with an air inlet and an air outlet. An air filtering assembly is provided having a first filter panel of resilient air filtering media and a second filter panel of resilient air filtering media. Second ends of the panels are joined and first ends of the panels are retained in spaced apart relation with opposing surfaces of the panels defining a filter chamber having an opening between the spaced apart first ends. The filter assembly is supported within the housing with the first ends disposed in a fixed position and with the filter assembly disposed for air to flow through the panels when passing from the housing inlet to the housing outlet. A displacement mechanism is provided for displacing the joined second ends against the resiliency of the panels from a rest position to a displaced position and releasing the joined second ends at the displaced position with the resiliency of the panels returning the second ends to the rest position in a snap-action manner. In a second embodiment the displacement mechanism imparts a filter plane force component which causes the joined second ends to vibrate or reciprocate, preferably substantially at the resonant frequency of the panels. This vibrating motion, like the snap-action motion associated with the first embodiment, dislodges the contaminants from the upstream side of the filter media.

Of course, embodiments of the invention could have multiple air filter assemblies to handle higher air flows.

BRIEF DESCRIPTION OF THE DRAWINGS

The invention is further explained with reference to the drawings which depicts preferred embodiments of the invention, and in which:

FIG. 1 is a view taken in elevation of a cabinet collector having a filtering assembly according to the present invention;

FIG. 2 is a view taken generally along line 2—2 of FIG. 1;

FIG. 3 is a view taken generally along line 3—3 of FIG. 1;

FIG. 4 is an exploded view taken in perspective of a filter assembly according to the present invention;

FIG. 5 is a view taken generally along line 5—5 of FIG. 4;

FIG. 6 is a view taken in elevation of an alternative embodiment of the present invention;

FIG. 7 is a view taken generally along line 7—7 of FIG. 6;

FIG. 8A diagrammatically illustrates the filter plane and fold plane components of an applied self-cleaning force on a panel filter according to the present invention; and FIG. 8B diagrammatically illustrates the filter plane and fold plane components on a twisted conical filter of the prior art.

DETAILED DESCRIPTION OF THE INVENTION

Reference is now made to the Drawing, in which like reference numerals represent like parts and assemblies throughout the several views.

Referring to FIG. 1, a cabinet collector according to the invention is generally shown at 10 and includes a pair of vertical spaced apart side walls 12 and 14. Shown in FIG. 2, the cabinet collector 10 also includes a spaced apart front wall 16 and back wall 18 which join side walls 12 and 14. Side walls 12 and 14, front wall 16 and back wall 18 cooperate to define a chamber 20 which is enclosed at its upper ends by top cover 22 and is enclosed at its lower end by a floor plate (not shown). Horizontal intermediate plate 24 extends between side walls 12 and front wall 16 and back wall 18 to separate chamber 20 into an upper chamber 20a and lower chamber 20b. A dirty air inlet 26 is preferably formed through back wall 18 in communication with lower chamber 20b, although the inlet 26 could be located in any wall which forms, at least partially, lower chamber 20b. A vertical baffle 27 spaced apart from the back wall 18 extends a portion of the way from the intermediate plate 24 to the floor plate (not shown).

An air outlet 28 is formed through cover 22 in communication with upper chamber 20a. A pair of parallel aligned spaced apart rectangular openings 30 and 32 are formed through intermediate plate 24 and provide air flow communication between lower chamber 20b and upper chamber 20a. A conventional blower 34 is secured to top cover 22 having an outlet in communication with air outlet 28. A motor 36 is mounted through any suitable means to cover 22 and is operably connected to blower 34 to draw suction within chamber 20a to provide air flow from inlet 26, around baffle 27, through openings 30 and 32 and out air outlet 28.

As shown in FIG. 2, air filtering assemblies 38 and 38' are provided for filtering dirty air as the air flows from chamber 20b to upper chamber 20a. More or fewer filter assemblies 38 could be employed depending on the flow rate, among other factors. The filter assemblies 38 and 38' are identical and a description of filter assembly 38 will suffice as the description of filter assembly 38'. With reference to FIGS. 4 and 5, filter assembly 38 includes a pair of generally rectangular filter panels 40 and 40a. Panels 40 and 40a are identical and a description of panel 40 will suffice as a description of panel 40a. Like elements will be provided with the same numeral designation except that the elements of panel 40a will also include the subscript "a". As mentioned, filter panel 40 is generally rectangular in shape and includes upper first end 42 and a lower second end 44 which is spaced from and parallel to first end 42. First and second side ends 46 and 48, respectively, together with first end 42 and second end 44 complete the rectangular perimeter of panel 40. It should be emphasized that the invention is not limited to a rectangular panel 40. A panel is a generally flat or planar filter (as opposed to a circular or conical filter, for example), but a panel isn't necessarily rectangular.

Panel 40 is preferably formed of resilient pleated air filtering media. Although many types of media possess sufficient resiliency for use in the instant application, polyester filter media appears to be most preferable. The filter media has a plurality of parallel fold lines including inner fold lines 50 and outer fold lines 52. Shown best in FIG. 5, inner fold lines 50 and outer fold lines 52 are alternatively spaced and extend perpendicular to first and second ends 42, 44. Alternately folded at fold lines 50 and 52, the panel 40 represents a plurality of alternately spaced peaks 54 and valleys 56. In FIG. 5, the spacing between opposing peaks and valleys is exaggerated. The peaks (or valleys) of panel 40 are coplanar with or parallel to an imaginary "filter plane". And, perpendicular to this imaginary filter plane are imaginary "fold planes" which pass through the fold lines. These imaginary planes are illustrated in FIGS. 8A and 8B for a panel filter according to the invention and the conical filter of Brenholt et al, respectively. The imaginary planes and the force components associated therewith will later be used to describe the operation of the invention.

As shown in FIGS. 1, 2 and 5, the second ends 44 and 44a are joined together with peaks 54 received within valleys 56a. Likewise, peaks 54a are received within valleys 56. With the second ends 44 and 44a of panels 40 and 40a so intermeshed, the joined second ends are secured together by an end cap 58. It should be noted that the panels 40 and 40a could actually be formed from a single piece of folded media. The second ends 44 are bonded within end cap 58 by any suitable means such as with a resin as is conventional. An upper end cap 60 is provided and is best shown in FIG. 4. As shown in FIG. 4, upper end cap 60 is a rectangular plate having a centrally disposed rectangular opening 62. End cap 60 is sized such that its length and width dimensions are greater than the length and width dimensions of openings 30 and 32. As shown in the Figures, the first ends 42 and 42a of panels 40 and 40a are bonded within opposing sides 61 and 61a of end cap 60. A ridge 64 is provided on a side of end cap 60 opposite the panels 40 and 40a. A pair of cross bars 66 and 68 span opening 62 and connect sides 61 and 61a. threaded studs 70 and 72 project upwardly away from cross bars 66, 68.

As shown in FIGS. 1 and 2, filter assemblies 38 and 38' are installed within lower chamber 20b. A foam gasket 74 is placed between upper end cap 60 and a lower surface of intermediate plate 24 with opening 62 in fluid flow communication with opening 32. So positioned, studs 70 and 72 project into upper chamber 20a. A pair of lock bars 76 and 78, shown in FIG. 4, having a longitudinal dimension sufficient to span the width of opening 32, and having holes 80 and 82 formed therethrough are placed over studs 70 and 72 and opposing the upper surface of intermediate plate 24. The lock bars 76 and 78 are secured in place by hand knobs 84 and 86 threadedly received by studs 70 and 72, respectively. By turning hand knobs 84 and 86, the filter assembly 38 is drawn upwardly toward intermediate plate 24 with ridge 64 forced into foam gasket 74 thereby insuring an airtight seal between end cap 60 and the lower surface of intermediate plate 24.

As shown in FIG. 4, each side of the filter assembly 38 is sealed by a trapezoidal flexible member 88 such as a sheet of the resilient filter media. With the structure of the filter assembly 38 as described above, it can be seen that the second ends 44 and 44a of the filter panels 40 and 40a are joined together with their respective peaks and valleys alternately interspersed. Also, the upper end plate 60 retains the upper first ends 42 and 42a in spaced apart alignment such that the filter assembly 38 assumes the profile of a wedge. Mounted to the end cap 58 is a downwardly extending strike plate 90 which is preferably angle iron or the like, a vertical face thereof acting as a strike surface. The strike plate 90 is preferably skewed toward one side of the wedge assembly 38, but assemblies 38 and 38' are interchangeable nonetheless. As stated above, assembly 38' is identical to assembly 38.

Referring to FIGS. 1, 2 and 3, also mounted in lower chamber 20b proximate the upstream or "dirty" sides of filter assemblies 38 and 38' is a filter displacing device 92. Displacing device 92 includes a gear motor 94 the casing of which is attached to side wall 14 via an extension bracket 96. A shaft 98 extends axially from the gear motor 94 and a rotary hammer 100 mounted on the distal end of shaft 98 extends radially therefrom. The rotary hammer 100 has an impact end 102 which is suitable for engaging the strike plates 90, 90' and displacing them against the resiliency of the filter media (as illustrated in FIG. 1).

The operation of cabinet collector 10 can now be described. Filter assemblies 38 and 38' are positioned and secured through the use of hand knobs 84 and 86. The blower motor 36 is activated, either manually or automatically upon initiation of the contaminant-generating process, and blower 34 evacuates upper chamber 20a so as to draw air from the lower chamber 20b and through the filter assemblies 38. This creates a subatmospheric pressure in chamber 20b which in turn draws contaminated air from the saw, grinder, or the like through the inlet 26 and around the baffle 27. The contaminated air is thereby drawn through the filter media with a large portion of the contaminant being deposited on the upstream or dirty sides of filter panels 40.

Periodically, or when the pressure drop across the panels 40 becomes excessive, blower 34 is shut off and the gear motor 94 is activated to cause the rotary hammer 100 to rotate or orbit about shaft 98. Impact end 102 of hammer 100 is thereby brought into contact with one of the strike plates 90 or 90'. Assuming (as shown in the Drawing) that it is strike plate 90 that is first engaged, as the shaft 98 continues to rotate the hammer 100 causes the second end 44 of the assembly 38 to move from its rest position to a displaced position, the former being illustrated in solid lines in FIG. 1 and the latter being illustrated in dashed lines in FIG. 1. In the displaced position the second end of assembly 38 is preferably approximately 1.25 inch away from its rest position, but this distance will vary depending on the resiliency of the filter media, among other things. The second ends 44, 44a move from their rest to their displaced positions in an imaginary plane 122 shown on edge in FIG. 2. Plane 122 bisects the wedge-shaped filter chamber formed by the filter panels 40 and 40a.

The strike plate 90 eventually disengages from the input end 102 of hammer 100, and the second end 44 of filter assembly 38 springs or snaps back to its rest position by virtue of the resiliency of the filter media. As illustrated in FIG. 3, the eventual disengagement of strike plate 90 from hammer 100 occurs because the strike plate 90 only covers or interferes with a portion of the entire orbit of the impact end 102. The sudden movement of filter assembly 38 from its displaced position to its rest position contributes to the dislodgement of contaminants from the upstream side of filter panels 40 and 40a. The resiliency of the filter media preferably causes the assembly 38 to actually revert to its rest position in a vibratory fashion, this type of motion being quite helpful in terms of breaking up the dust cake.

The cleaning force generated by displacing means 92 is applied to the filter panels 40 and 40a such that it has a substantial "filter plane" component and a relatively insubstantial or negligible "fold plane" component. The "filter plane" and "fold plane" are shown in FIG. 8A. A filter plane is an imaginary plane parallel to the peaks or valleys of a panel, whereas a fold plane is an imaginary plane perpendicular to the filter plane passing through one of the folds of the panel. The "filter plane component" is the component of the cleaning force applied to the panel that lies in or is parallel to the filter plane. This component is beneficial in that it causes the pleats to fold and/or causes the individual pleats to bend. On the other hand, the "fold plane component" lies in a fold plane and tends to cause the pleats to collapse. In view of this, the fold plane component is preferably small in comparison to the filter plane component. The fold plane component can be eliminated altogether in preferred embodiments.

Having defined the filter plane of panels 40 and 40a, it can readily be seen that the second ends 44, 44a are preferably moved in a direction parallel to the line of intersection of the filter planes during the self-cleaning process.

Once strike plate 90 has disengaged from hammer 100, the latter proceeds to engage plate 90' to cause assembly 38' to move in a similar fashion, but in the opposite direction. The gear motor 94 can be energized for a time sufficient to activate assemblies 38 and 38' one time each or multiple times each. Preferably, the gear motor 94 is operated at approximately 10 RPM, although other speeds could be used to achieve the same effect.

FIGS. 6 and 7 illustrate portions of a second embodiment according to the invention. In this embodiment, the filter displacing means is located on the downstream or clean sides of the filter panels. The displacing means includes an electric motor 104 having a shaft 106 supporting a paddle wheel 108. The paddle wheel 108 engages a drive pin 110 extending upwardly from an inner stand 112 which in turn extends upwardly from the end cap 58. The drive pin 110 and inner stand 112 can be fabricated from light gauge steel or a plastic material. The stand 112 is connected to end cap 58 using a suitable technique such as welding or resin bonding. Alternatively, the inner stand 112 could be integral with end cap 58.

The operation of the second embodiment can now be described. When it is time to clean the filter assemblies 38, 38' based either on time or excessive pressure drop, the motor 104 is energized. This causes paddle wheel 108 to rotate which in turn causes drive pin 110, inner stand 112 and the second ends 44 and 44a of assembly 38 to vibrate back and forth in the direction of arrow 120 shown in FIG. 7. The resiliency of the filter media urges the drive pin 110 into contact with succeeding cutouts or relieved areas in the paddle wheel 108.

The rate of rotation of motor 104 is preferably chosen such that filter assembly 38 vibrates at or near one of its resonant frequencies. This condition is chosen since at resonance the filter assembly 38 will vibrate with the greatest amplitude for the least amount of energy input, and, the greater the amplitude, the more dust removal.

For example, with one woven polyester filter media, the optimum frequency was found to be 38 Hz. The resonant frequencies for a filter can be determined in a conventional manner, e.g., by forcing the filter to vibrate at various frequencies while determining its response using an accelerometer.

The motor 104 can be rotated for a present period of time or until the pressure drop across the filter becomes acceptable.

There is preferably one motor 104 or 104' for each assembly 38 or 38' since the motor 104, 104' are located on the clean side of the filter panels 40. The motors 104, 104' can be simultaneously or alternately activated.

In addition, for both embodiments, the fan motor 36 can be temporarily stopped during the self-cleaning process so that dust cake particles can more readily be dislodged. It is even contemplated that flow could be temporarily reversed through the filter meda during the cleaning process to enhance disruption of the dust cake.

It should be emphasized that the present invention is not limited to any particular components, materials or configurations, and modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes as presented herein. All alternative modifications and variations of the present invention which fall within the spirit and broad scope of the appended claims are included.

We claim:

1. An air filtering apparatus including a filter panel defining a filter plane and a fold plane and having a plurality of pleats formed of alternating peaks and valleys, said filter panel including an upper end cap and a lower end cap, said end caps being of an elongated rectangular shape, said filter panel further including a pair of flexible end members secured to said end caps, said pleats being integrally mounted in said end caps, said end caps serving to hold said pleats in place;
   a housing having an air inlet and an air outlet;
   means for supporting the filter panel within the housing such that air can flow through the filter panel when passing from the air inlet to the air outlet; and
   means for applying a force in a parallel direction to the filter panel having a filter plane component and a negligible fold plane component, whereby the filter plane component assists in the cleaning of the filter panel, and whereby the fold plane component is insufficient to collapse the pleats.

2. An air filtering apparatus comprising:
   (a) a filter panel defining a filter plane and a fold plane and having a plurality of pleats formed of alternating peaks and valleys, said filter panel further including an elongated upper end cap and an elongated lower end cap, said pleats being bonded to said upper and lower end caps;
   (b) a housing having an air inlet and an air outlet;
   (c) means for supporting the filter panel within the housing such that air can flow through the filter panel when passing from the air inlet to the air outlet; and
   (d) means for applying a force to the filter panel having a filter plane component and a relatively insubstantial fold plane component, said force being in a parallel direction corresponding to the length of the elongated end caps, whereby the filter plane component assists in the cleaning of the filter panel, and whereby the fold plane component is insufficient to collapse the pleats.

3. The air filtering apparatus of claim 2, wherein a first end of the filter panel is fixedly secured to the housing and wherein a second end of the filter panel is displaced from a rest position to a displaced position and back to the rest position, whereby the upstream side of the filter panel is cleaned.

4. The air filtering apparatus of claim 3, wherein the second end of the filter panel is displaced from the rest position to the displaced position against the resiliency of the filter panel and is allowed to suddenly return from the displaced position to the rest position.

5. The air filtering apparatus of claim 4, wherein the force applying means comprises a rotary motor having a casing secured to the housing, a shaft extending axially from the casing, and a pivot arm extending radially from the shaft, wherein the distal end of the pivot arm intermittently engages the second end of the filter panel to displace it from its rest position to its displaced position and, once the second end reaches its displaced position, allows the second end to suddenly snap from its displaced position back to its rest position.

6. The air filtering apparatus of claim 3, wherein the second end of the filter panel moves from one position to the other in vibratory fashion.

7. The air filtering apparatus of claim 6, wherein the force applying means causes the filter panel to vibrate substantially at its resonant frequency.

8. The air filtering apparatus of claim 7, wherein the force applying means comprises a rotary motor having a casing secured to the housing, a shaft extending axially from the casing, and a paddle wheel connected to the shaft, wherein the motor causes the paddle wheel to rotate which in turn imparts a vibratory motion to the second end of the filter panel.

9. An air filtering apparatus comprising:
   (a) a housing having an air inlet and an air outlet;
   (b) a filter assembly having resilient pleated filter media formed into a plurality of alternating peaks and valleys extending from a first end to a second end, the filter assembly defining a filter plane and a fold plane;
   (c) means for supporting the filter assembly within the housing with the first end secured in a fixed position and with the filter assembly disposed for air to flow through the media when passing from the inlet to the outlet; and
   (d) means for displacing the filter assembly second end against the resiliency of the media from a rest position to a displaced position in a direction parallel to the filter plane and allowing the second end to return from the displaced position to the rest position, whereby the media is cleaned.

10. The air filtering apparatus according to claim 9, wherein the displacing means comprise means for moving the filter assembly second end in a direction generally parallel to the filter plane.

11. The air filtering apparatus of claim 10, wherein the displacing means comprises a rotary motor having a casing secured to the housing, a shaft extending axially from the casing and a pivot arm extending radially from the shaft, wherein the distal end of the pivot arm intermittently engages the second end of the filter assembly to displace it from its rest position to its displaced posiposition, allows the second end to suddenly snap from its displaced position back to its rest position.

12. The air filtering apparatus of claim 11, wherein the rotary motor is disposed on the upstream side of the filter assembly.

13. The air filtering apparatus of claim 10, wherein the displacing means comprises a rotary motor having a casing secured to the housing, a shaft extending axially from a casing, and a paddle wheel connected to the shaft, wherein the motor causes the paddle wheel to rotate which in turn imparts a vibratory motion to the second end of the filter assembly.

14. The air filtering apparatus of claim 13, wherein the displacing means is disposed on the downstream side of the filter assembly.

15. An air filtering apparatus comprising:
(a) a housing having an air inlet and an air outlet;
(b) an air filtering assembly having a first filter panel of resilient air filtering media and a second filter panel of resilient air filtering media, the filter panels each having a first end and a second end;
(c) means for joining the second ends of the panels such that the first ends of the panels are retained in spaced apart relation with opposing surfaces of the panels defining a filter chamber having an opening between the spaced apart first ends;
(d) means for supporting the filter assembly within the housing with the first ends disposed in a fixed position and with the filter assembly disposed within the housing for air to flow through the panels when passing from the inlet to the outlet and with the joined second ends assuming a rest position; and
(e) means for displacing in a parallel direction the joined second ends against the resiliency of the panels to a displaced position and releasing the joined second ends at the displaced position, wherein the resiliency of the panels returns the second ends to the rest position, whereby the filter panels are cleaned.

16. The air filtering apparatus according to claim 15, wherein the displacing means comprises means for moving the joined second ends in a direction generally parallel to a plane bisecting the filter chamber formed by the filter panels.

17. The air filtering apparatus according to claim 15, wherein each of the panels is formed of pleated filter media having a plurality of alternating peaks and valleys extending from the first end to the second end, the panels joined at their second ends with peaks of each of the panels received within opposing valleys of the opposing panel.

18. The air filtering apparatus according to claim 15, wherein each of the panels is formed of pleated filter media having a plurality of alternating peaks and valleys extending from the first end to the second end, wherein a first filter plane is associated with the first panel and a second filter plane is associated with the second panel, and wherein the displacement means comprises means for moving the joined second ends in a direction generally parallel to a line of intersection of the filter planes.

19. The air filtering apparatus according to claim 18, wherein the displacing means comprises:
(a) a hammer member having an impact end disposed for rotation about an orbit; and
(b) a target surface secured to said joined second ends with the target surface and hammer member aligned for the hammer member to impact the target surface during a portion of the orbit and urge the joined second ends from the rest position to the displaced position.

20. The air filtering apparatus according to claim 18, wherein the peaks of each of the panels are disposed within alternating valleys of the other panel at the panel second ends.

21. The air filtering apparatus according to claim 18, further comprising a common end plate in contact with the panel second ends and a strike member in contact with the common end plate disposed to be impacted by the displacement means.

22. The air filtering apparatus according to claim 21, wherein the displacing means comprises means for engaging the strike member secured to the second ends when in the rest position, and means for drawing the strike member a predetermined distance in opposition to the resiliency of the media before releasing the member to allow the second ends of the panels to assume their rest position.

23. The air filtering apparatus according to claim 22, wherein the displacing means comprises a rotary hammer having an impact end disposed for rotation about an orbit with a portion of the orbit parallel to the line of intersection of the filter planes.

24. The air filtering apparatus according to claim 18, wherein the displacing means causes the joined second panel ends to move from their rest positions to their displaced positions and then to snap back to their rest positions.

25. The air filtering apparatus according to claim 18, wherein the displacing means causes the joined second panel ends to reciprocate from their rest to their displaced positions.

26. A method for cleaning an elongated filter panel defining a filter plane and a fold plane and having a plurality of pleats formed from alternating peaks and valleys, comprising the steps of:
(a) supporting the elongated filter panel such that air can flow therethrough; and
(b) intermittently applying a force in a parallel direction to the filter panel having a filter plane component and a relatively insubstantial fold plane component, whereby the filter plane component assists in the cleaning of the filter panel, and whereby the fold plane component is insufficient to collapse the pleats.

* * * * *